US011584316B2

(12) United States Patent
Suzuki et al.

(10) Patent No.: US 11,584,316 B2
(45) Date of Patent: Feb. 21, 2023

(54) COMMUNICATION SYSTEM AND VICARIOUS INPUTTING AND OUTPUTTING UNIT

(71) Applicant: Yazaki Corporation, Tokyo (JP)

(72) Inventors: Masashi Suzuki, Makinohara (JP); Jun Goto, Makinohara (JP); Hideo Takahashi, Makinohara (JP); Sadaharu Okuda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 172 days.

(21) Appl. No.: 17/172,587

(22) Filed: Feb. 10, 2021

(65) Prior Publication Data

US 2021/0245686 A1 Aug. 12, 2021

(30) Foreign Application Priority Data

Feb. 10, 2020 (JP) .............................. JP2020-020626

(51) Int. Cl.
*H04L 67/12* (2022.01)
*B60R 16/023* (2006.01)
*H04L 12/40* (2006.01)

(52) U.S. Cl.
CPC ...... *B60R 16/0238* (2013.01); *B60R 16/0231* (2013.01); *H04L 12/40039* (2013.01); *H04L 67/12* (2013.01); *H04L 2012/40273* (2013.01)

(58) Field of Classification Search
CPC . B60R 16/0238; B60R 16/0231; B60R 16/03; B60R 16/0315; B60R 16/023; B60R 16/02; H04L 12/40039; H04L 67/12; H04L 2012/40273

USPC ........................................................ 307/10.1
See application file for complete search history.

(56) References Cited

U.S. PATENT DOCUMENTS

| | | | |
|---|---|---|---|
| 2004/0236873 A1 | 11/2004 | Kasame et al. | |
| 2014/0236422 A1 | 8/2014 | Umino et al. | |
| 2015/0349471 A1 | 12/2015 | Maki et al. | |
| 2017/0317515 A1* | 11/2017 | Satake | B60L 1/14 |
| 2019/0074641 A1 | 3/2019 | Maki et al. | |

FOREIGN PATENT DOCUMENTS

| | | |
|---|---|---|
| JP | H09-259068 A | 10/1997 |
| JP | 2004-287475 A | 10/2004 |
| JP | 2005-047302 A | 2/2005 |
| JP | 2011-076972 A | 4/2011 |
| JP | 2013-071611 A | 4/2013 |
| JP | 2016-015809 A | 1/2016 |
| JP | 2018-052229 A | 4/2018 |

* cited by examiner

*Primary Examiner* — Richard Tan
(74) *Attorney, Agent, or Firm* — Banner & Witcoff, Ltd.

(57) ABSTRACT

A communication system includes a host control device and a vicarious inputting and outputting unit that controls an electric device by communicating with the host control device. The vicarious inputting and outputting unit includes a standard board provided with a first control circuit which controls the electric device and at least one of an input circuit and an output circuit for a standard electric device. The first control circuit has an extension terminal for connection to an extension board provided with at least one of an input circuit and an output circuit for an extended electric device and is provided so as to be able to operate in response to respective specifications of plural kinds of extension terminals, and a specification of the extension terminal is set through communication with the host control device.

7 Claims, 7 Drawing Sheets

COMMUNICATION SYSTEM AND VICARIOUS INPUTTING AND OUTPUTTING UNIT

CROSS REFERENCE TO RELATED APPLICATIONS

This application is based on Japanese Patent Application No. 2020-020626 filed on Feb. 10, 2020, the contents of which are incorporated herein by reference.

BACKGROUND OF THE INVENTION

1. Field of the Invention

The present disclosure relates to a communication system and a vicarious inputting and outputting unit.

2. Description of the Related Art

In recent years, communication systems have been studied in which a vicarious inputting and outputting unit controls loads in each area according to instructions from a central ECU in such a manner that the central ECU communicates with vicarious inputting and outputting units provided in respective areas of a vehicle (refer to JP-A-2016-15809, JP-A-2011-76972 and JP-A-2018-52229).

Incidentally, there are a variety of vehicle specifications. For example, low-grade vehicles are equipped with only standard electric devices and high-grade vehicles are outfitted with extended electric devices in addition to standard ones. Furthermore, the kinds of extended electric devices provided on a vehicle vary depending on its specification. As a result, in conventional communication systems, vicarious inputting and outputting units need to be designed and prepared so as to be suitable for each vehicle specification, raising a cost-related problem.

SUMMARY OF THE INVENTION

The present disclosure has been made in view of the above circumstances in the art, and an object of the disclosure is therefore to provide a communication system that need not be equipped with a vicarious inputting and outputting unit for each specification and hence is lowered in cost as well as a vicarious inputting and outputting unit provided in such a communication system.

To attain the above object, the disclosure provides a communication system and a vicarious inputting and outputting unit having the following features:

There is provided a communication system including:
a host control device; and
a vicarious inputting and outputting unit that controls an electric device by communicating with the host control device, wherein:
the vicarious inputting and outputting unit includes a standard board provided with a first control circuit which controls the electric device and at least one of an input circuit and an output circuit for a standard electric device; and
the first control circuit has an extension terminal for connection to an extension board provided with at least one of an input circuit and an output circuit for an extended electric device and is provided so as to be able to operate in response to respective specifications of plural kinds of extension terminals, and a specification of the extension terminal is set through communication with the host control device.

There is also provided a vicarious inputting and outputting unit for controlling an electric device by communicating with a host control device, including:
a standard board provided with a first control circuit which controls the electric device and at least one of an input circuit and an output circuit for a standard electric device,
wherein the first control circuit has an extension terminal for connection to an extension board provided with at least one of an input circuit and an output circuit for an extended electric device and is provided so as to be able to operate in response to respective specifications of plural kinds of extension terminals, and a specification of the extension terminal is set through communication with the host control device.

As described above, the disclosure can provide a communication system that need not be equipped with a vicarious inputting and outputting unit for each specification and hence is lowered in cost as well as a vicarious inputting and outputting unit provided in such a communication system.

The disclosure has been described above concisely. The details of the disclosure will become more apparent when the modes for carrying out the disclosure (hereinafter referred to as embodiments) described below are read through with reference to the accompanying drawings.

DESCRIPTION OF EMBODIMENTS

Embodiment 1

A specific first embodiment of the present disclosure will be hereinafter described with reference to the drawings.

Figure 1:
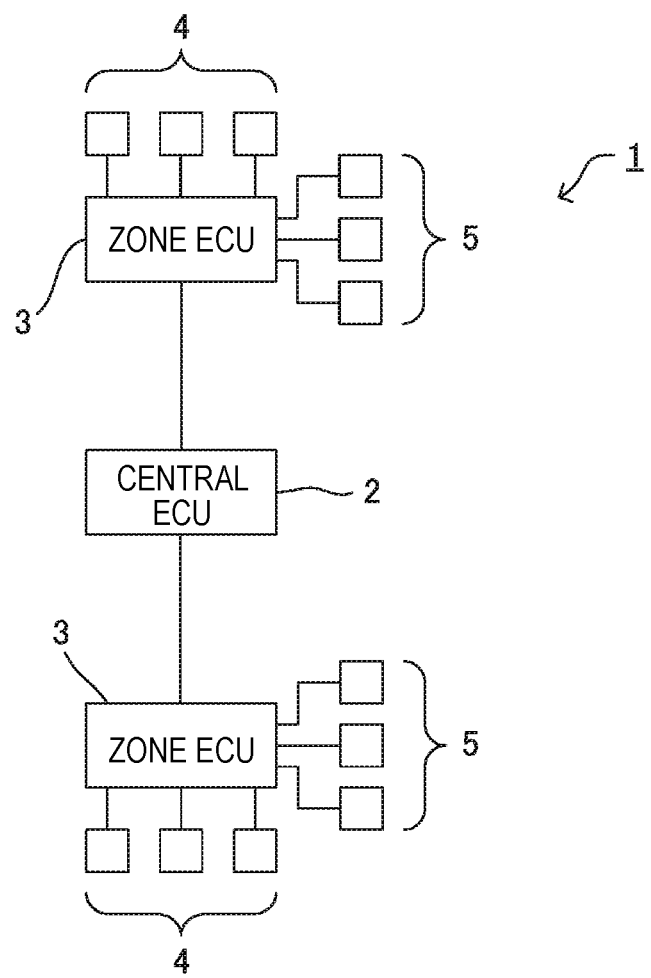
FIG. 1 is a block diagram of a communication system according to a first embodiment of the present disclosure.

FIG. 1 is a block diagram of a communication system 1 according to the first embodiment of the disclosure which is provided in a vehicle. The communication system 1 is equipped with a central ECU 2 (host control device) and zone ECUs 3.

The central ECU 2 is a microcomputer having a CPU and is provided in, for example, the instrument panel of a vehicle. The central ECU 2 controls the entire communication system 1.

The zone ECUs 3 are provided in respective areas (e.g., left door and right door) of a vehicle. Each zone ECU 3 controls standard electric devices 4 and extended electric devices 5 provided in the corresponding area according to instructions from the central ECU 2 by communicating with the central ECU 2. The standard electric devices 4 are electric devices (air-conditioning unit, power window unit, etc.) that are installed in common in target vehicles. The extended electric devices 5 are electric devices that are selectively installed in target vehicles according to their specifications. The extended electric devices 5 may be installed either at the time of or after shipment of a vehicle.

Figure 2:
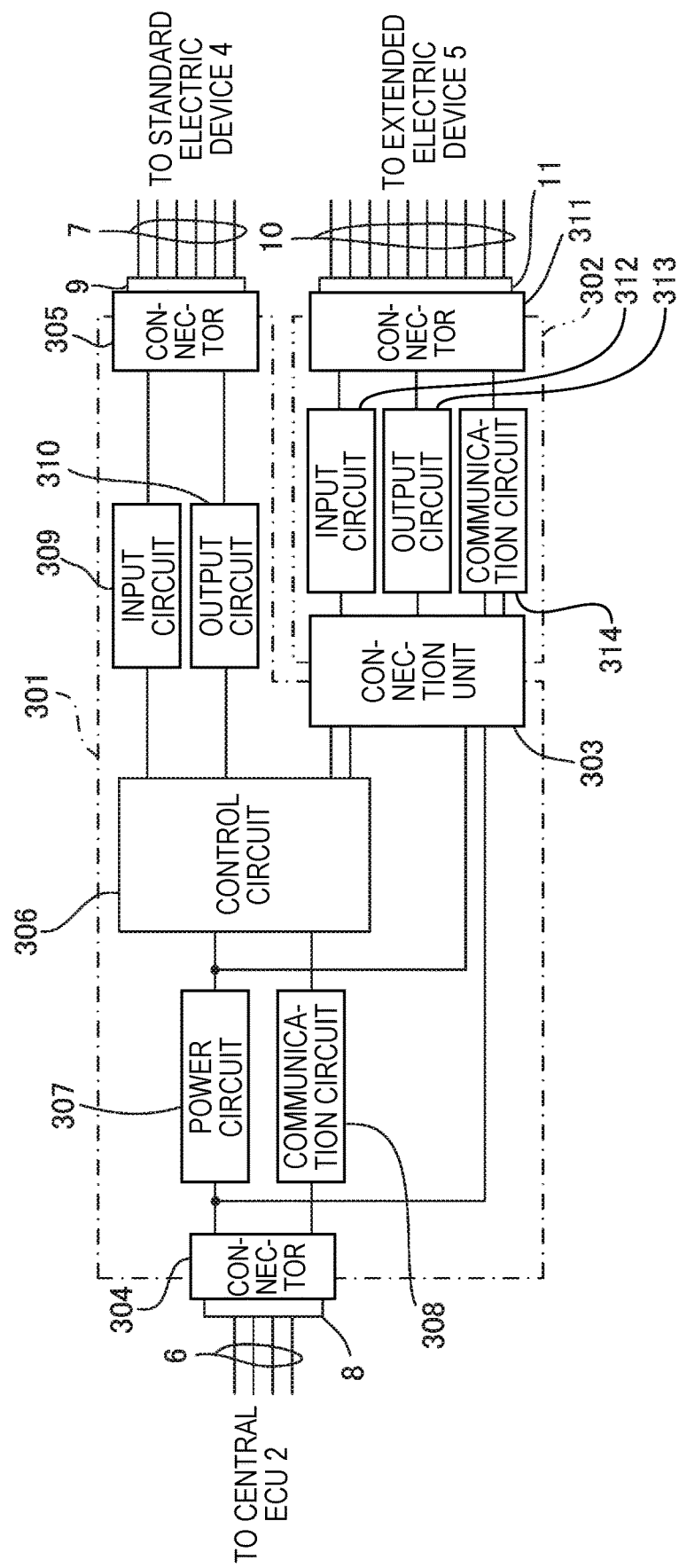
FIG. 2 is a detailed circuit diagram of each zone ECU shown in FIG. 1.

Next, the electrical configuration of each zone ECU 3 will be described with reference to FIG. 2. As shown in FIG. 2, each zone ECU 3 is equipped with a standard board 301 (vicarious inputting and outputting unit) for operating the standard electric devices 4, an extension board 302 for operating the extended electric devices 5, and a connection unit 303 for connecting the standard board 301 and the extension board 302. When the zone ECU 3 is installed in a low-grade target vehicle to be equipped with only the standard electric devices 4, the extension board 302 is not connected to the standard board 301.

Where a target vehicle is to be equipped with the extended electric devices 5, the extended electric devices 5 are operated by connecting the extension board 302 to the standard board 301 as shown in FIG. 2. An extension board 302 is prepared that corresponds to each of different combinations of extended electric devices 5 for respective target vehicle specifications. An extension board 302 corresponding to a target vehicle specification is selected and connected to the standard board 301 at the time of shipment.

The standard board 301 is equipped with plural connectors 304 and 305, a control circuit 306 (first control circuit), a power circuit 307, a communication circuit 308, etc. The connector 304 is connected directly to a counterpart connector 8 which is provided at an end portion of a wire harness 6. The wire harness 6 is connected directly to the central ECU 2. The connector 305 is connected to a counterpart connector 9 which is provided at an end portion of a wire harness 7. The wire harness 7 is connected to the standard electric devices 4.

For example, the control circuit 306 is a microcomputer having a CPU. The control circuit 306 controls the standard electric devices 4 and the extended electric devices 5 according to instructions from the central ECU 2 by communicating with the central ECU 2. The power circuit 307 generates power for the control circuit 306 on the basis of power that is supplied via the connector 304. The communication circuit 308 is a circuit for performing modulation, demodulation, etc. on communication signals that are exchanged between the central ECU 2 and the control circuit 306.

The standard board 301 is provided with various kinds of circuits that are suitable for the kinds of standard electric devices 4 (in the example of FIG. 2, one input circuit 309 and one output circuit 310 are provided). For example, where the standard electric devices 4 are devices (e.g., detection switches) for giving on/off information to the control circuit 306, the input circuit 309 is provided for those standard electric devices 4. Where the standard electric devices 4 are devices (e.g., motors and lamps) that operate according to outputs of the control circuit 306, the output circuit 310 is provided for those standard electric devices 4. Where the standard electric devices 4 are devices that communicate with the control circuit 306, a communication circuit (not shown) may be provided for those standard electric devices 4.

The extension board 302 can be connected selectively to the standard board 301 by the connection unit 303. In the embodiment, by using a pin header as the connection unit 303, the standard board 301 and the extension board 302 are connected to each other without intervention of a wire harness.

The extension board 302 is equipped with a connector 311 etc. The connector 311 is connected directly to a counterpart connector 11 which is provided at an end portion of a wire harness 10. The wire harness 10 is connected to the extended electric devices 5. Similarly to the standard board 301, the extension board 302 is provided with various kinds of circuits that are suitable for the kinds of extended electric devices 5 (in the example of FIG. 2, one input circuit, 312, one output circuit 313, and one communication circuit 314 are provided).

Figure 3:
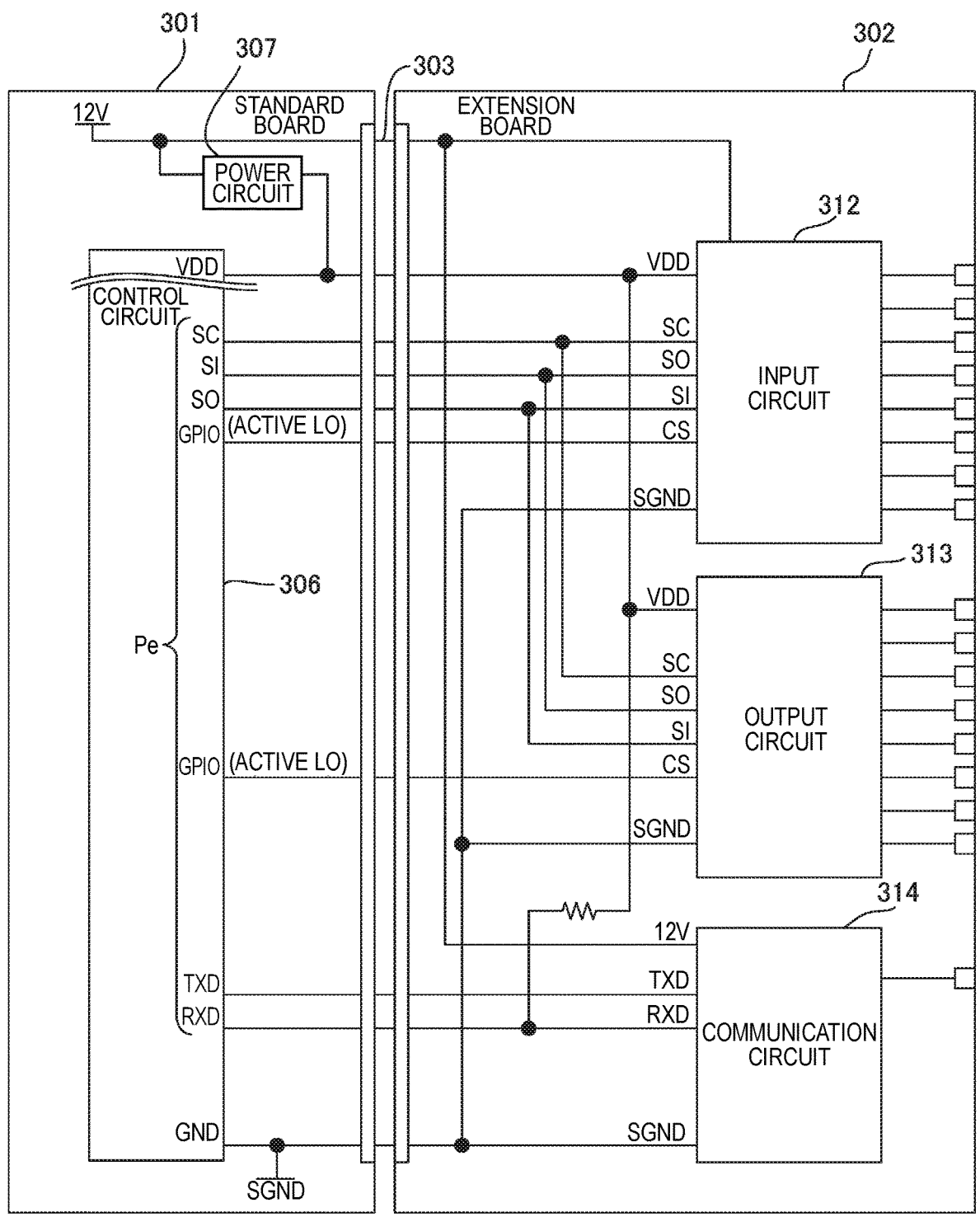
FIG. 3 is a circuit diagram, more detailed than FIG. 2, of each zone ECU employed in the first embodiment.
Figure 4:
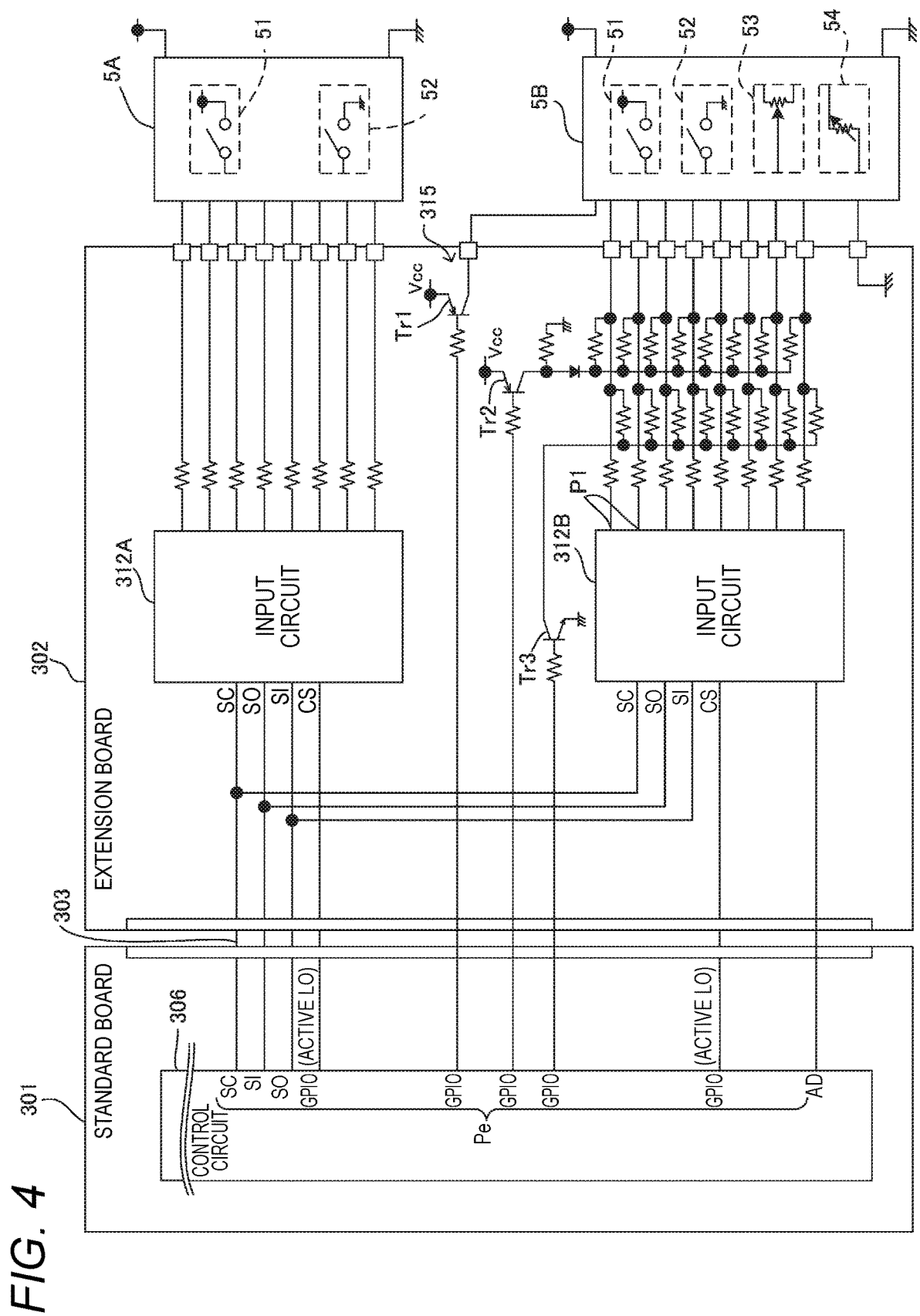
FIG. 4 is a circuit diagram, more detailed than FIG. 2, of each zone ECU employed in a second embodiment.

Next, detailed configurations of the standard board 301 and the extension board 302 which have been described above roughly with reference to FIG. 2 will be described with reference to FIG. 3. The control circuit 306 is equipped with a power terminal VDD which is supplied with power generated by the power circuit 307, a ground terminal GND which is connected to the ground, standard terminals (not shown) which are connected to the various circuits such as the input circuit 309 and the output circuit 310 provided in the standard board 301, and extension terminals Pe which are connected to the extension board 302. When the extension board 302 is connected to the standard board 301, the power terminal VDD and the ground terminal GND of the standard board 301 are connected to the extension board 302, whereby power is supplied from the standard board 301 to the extension board 302.

In this embodiment, serial communication is employed as electrical connection between the control circuit 306 and each of the input circuit 312 and the output circuit 313 of the extension board 302. The control circuit 306 has, as the extension terminals Pe, a serial clock terminal SC, a serial input terminal SI, a serial output terminal SO, plural general-purpose input/output terminals GPIO, a transmission terminal TXD, and a reception terminal RXD.

The serial clock terminal SC is a terminal for outputting a clock signal from the control circuit 306 to the input circuit 312 and the output circuit 313. The serial input terminal SI is a terminal for inputting, to the control circuit 306, a serial signal that is output from the input circuit 312 or the output circuit 313. The serial output terminal SO is a terminal for inputting, to the input circuit 312 or the output circuit 313, a serial signal that is output from the control circuit 306. The plural general-purpose input/output terminals GPIO are connected to chip selector terminals CS of the input circuit 312 or the output circuit 313, respectively.

In the embodiment, the chip selector terminals CS of the input circuit 312 and the output circuit 313 function in a manner of active LO. When the control circuit 306 outputs an Lo signal to the chip selector terminal CS of the input circuit 312, the input circuit 312 converts each of input signals received from the plural extended electric devices 5 to a serial signal and outputs the latter to the serial input terminal SI of the control circuit 306 in synchronism with the clock signal. Upon receiving a serial signal of corresponding bits, the control circuit 306 terminates the sending of the clock signal and returns the level of the output signal being supplied to the chip selector terminal CS of the input circuit 312 to Hi. The control circuit 306 converts the serial signal received at the serial input terminal SI into parallel signals and performs various kinds of processing such as recording them to a memory.

The control circuit 306 outputs an Lo signal to the chip selector terminal CS of the output circuit 313 and outputs a serial signal of output information from its serial output terminal SO in synchronism with the clock signal. In response, the output circuit 313 receives corresponding bits of the serial signal of the output information, converts the received serial signal into parallel signals, and outputs the latter to corresponding extended electric devices 5. Upon outputting the serial signal of the output information, the control circuit 306 terminates the sending of the clock signal and returns the level of the output signal being supplied to the chip selector terminal CS of the output circuit 313 to Hi.

With the above-described control circuit 306, the number of input circuits 312 or output circuit 313 can be increased up to the number of general-purpose input/output terminals GPIO. Furthermore, since each of the serial input terminal SI and the serial output terminal SO can be shared by plural extended electric devices 5 by performing a serial communication between the control circuit 306 and each of the input circuit 312 and the output circuit 313, the number of terminals of the control circuit 306 can be suppressed and the control circuit 306 and the connection unit 303 can be miniaturized.

The transmission terminal TXD is a terminal for sending a signal to the communication circuit 314. The reception terminal RXD is a terminal for receiving a signal from the communication circuit 314.

Next, a description will be made of initial setting of the communication system 1 having the above-described configuration. In the initial setting, the central ECU 2 communicates with the control circuit 306 and thereby causes the control circuit 306 to check connection/non-connection of an extension board 302 and to perform setting of the extension terminals Pe according to the kind of a connected extension board 302.

The central ECU 2 is stored with, in advance, control programs for controlling the electric devices 4 and 5 and an initial setting program for initial setting of the control circuit 306. Where no extension board 302 is to be connected, the central ECU 2 is stored with, as the initial setting program, a program for setting software of the control circuit 306 so that it does not use the extension terminals Pe.

Where an extension board 302 is to be connected, the central ECU 2 is stored with an initial setting program for setting software of the control circuit 306 so that it can control the extended electric devices 5 via the extension terminals Pe. The initial setting program varies depending on the kind of an extension board 302.

Next, a detailed description will be made of the setting of the serial clock terminal SC, the serial input terminal SI, the serial output terminal SO, and the general-purpose input/output terminals GPIO in a case that an extension board 302 is to be connected. For example, where two general-purpose input/output terminals GPIO are provided as shown in FIG. 3, extension can be made to deal with, in the maximum case, two input circuits 312, two output circuits 313, or one input circuit 312 and one output circuit 313. For example, where the following three kinds of configurations (configurations 1) to 3)) are prepared for the extension board 302, an extension board 302 that is suitable for a target vehicle specification is selected and connected to the standard board 301:

1) two input circuits 312 are to be employed;
2) one input circuit 312 and one output circuit 313 are to be employed; and
3) two output circuits 313 are to be employed.

The software of the control circuit 306 is designed so as to be able to select an input specification (active Hi input or active Lo input) of the serial input terminal SI according to the specification (active Hi input or active Lo input) of an input circuit 312. Furthermore, the software of the control circuit 306 is designed so as to be able to select an output specification (source output or sync output) of the serial output terminal SO according to the specification (source output or sync output) of an output circuit 313.

The central ECU 2 performs software setting relating to the serial input terminal SI and the serial output terminal SO of the control circuit 306 according to the kind of an extension board 302. More specifically, where an input circuit 312 is connected to a general-purpose input/output terminal GPIO, the central ECU 2 instructs the control circuit 306 to set the input specification of the serial input terminal SI in a case that the general-purpose input/output terminal GPIO is made active Lo to one that is suitable for the specification of the input circuit 312. Furthermore, where an output circuit 313 connected to a general-purpose input/output terminal GPIO, the central ECU 2 instructs the control circuit 306 to set the output specification of the serial output terminal SO in a case that the general-purpose input/output terminal GPIO is made active Lo to one that is suitable for the specification of the output circuit 313.

Next, a detailed description will be made of the setting of the transmission terminal TXD and the reception terminal RXD in a case that an extension board 302 is to be connected. Where the extension board 302 is not provided with any communication circuit 314, the central ECU 2 makes settings so that the transmission terminal TXD and the reception terminal RXD are not used. Where the extension board 302 is provided with a communication circuit 314, the central ECU 2 makes settings so that the transmission terminal TXD and the reception terminal RXD are used.

In the above-described embodiment, the control circuit 306 is provided so as to be able to operate in such a manner as to be suitable for specifications of the plural kinds of extension terminals Pe and the specifications of the extension terminals Pe are set through communication with the central ECU 2. This measure makes it possible to accommodate specification differences between target vehicles by altering the software of the central ECU 2 specification so as to be suitable for each specification, selecting an extension board 302 for the specification, and connecting the selected extension board 302 to the standard board 301. As a result, it is not necessary to provide, for each specification, a standard board 301 to be installed in a target vehicle as a standard board and cost reduction can be attained.

According to the above-described embodiment, the control circuit 306 can set an input specification of the serial input terminal SI and an output specification of the serial output terminal SO according to an input specification of the input circuit 312 provided in the extension board 302 and an output specification of the output circuit 313 provided in the extension board 302, respectively, by communicating with the central ECU 2. This means enhanced extendability.

Although in the above-described embodiment the standard board 301 is provided with the input circuit 309 and the output circuit 310, the disclosure is not limited to this configuration. It suffices that at least one of the input circuit 309 and the output circuit 310 be provided in the standard board 301.

Although in the above-described embodiment the extension board 302 is provided with the input circuit 312 and the output circuit 313, the disclosure is not limited to this configuration. It suffices that at least one of the input circuit 312 and the output circuit 313 be provided in the extension board 302.

Furthermore, although the above-described embodiment employs serial communication as electrical connection between the control circuit 306 and each of the input circuit 312 and the output circuit 313 of the extension board 302, the disclosure is not limited to this configuration. Where increase in the number of extension terminals Pe causes no problem, input circuits 312 and output circuits 313 may be provided in the same number as extended electric devices 5 are without using serial communication.

Embodiment 2

Next, a communication system 1A according to a second embodiment will be described with reference to FIGS. 4 and 5A-5D. The second embodiment is much different from the first embodiment in the extension terminals Pe of the control circuit 306 and the configuration of the extension board 302. In the second embodiment, the control circuit 306 is equipped with, as extension terminals Pe, an analog input terminal AD in addition to, and as in the first embodiment, a serial clock terminal SC, a serial input terminal SI, a serial output terminal SO, and plural (five in the example shown in FIG. 4) general-purpose input/output terminal GPIO. Providing the analog input terminal AD as an extension terminal Pe in this manner makes it possible to connect an extended electric device 5 that outputs an analog value, such as a sensor.

An input circuit 312A which is provided in the extension board 302 is provided as a circuit capable of selecting its input specification (active Hi input or active Lo input) according to an extended electric device 5A. At the time of initial setting, the central ECU 2 communicates with the control circuit 306 and thereby causes the control circuit 306 to set the input circuit 312A. More specifically, where a switch 51 is active-Hi-connected as an extended electric device 5A, at the time of initial setting the central ECU 2 instructs the control circuit 306 to switch the input circuit 312A to active Hi input. Where a switch 52 is active-Lo-connected as an extended electric device 5A, at the time of initial setting the central ECU 2 instructs the control circuit 306 to switch the input circuit 312A to active Lo input.

An input circuit 312B which is provided in the extension board 302 is provided as a circuit capable of accommodating both of analog input and digital input.

The extension board 302 is equipped with a switching circuit 315 capable of switching between a digital input specification (active Lo or active Hi) and an analog input specification (whether an extended electric device 5B is a three-terminal variable resistor 53 or a two-terminal variable resistor 54).

Figure 5A:
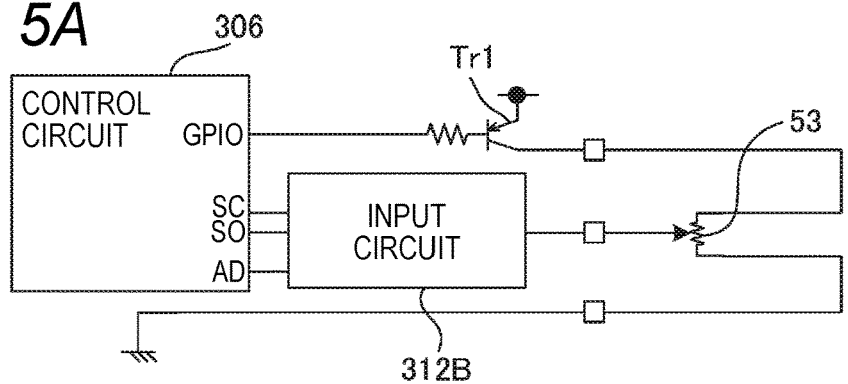
FIGS. 5A to 5D are diagrams illustrating how a switching circuit shown in FIG. 4 operates.

The switching circuit 315 has transistors Tr1 to Tr3. The transistor Tr1, which is a pnp transistor, is disposed between a voltage source Vcc and a terminal that is connected to the extended electric devices 5B and its base is connected to a general-purpose input/output terminal GPIO of the control circuit 306. As shown in FIG. 5A, one end of the three-terminal variable resistor 53 is connected to the collector of the transistor Tr1, the other end is grounded, and a halfway point is connected to the input circuit 312B. With these connections, an (analog) electrical signal that reflects a resistance value of the variable resistor 53 can be input to the input circuit 312B while the transistor Tr1 is on. The input circuit 312B holds an analog value received while the transistor Tr1 is on and outputs it to the analog input terminal AD of the control circuit 306.

Figure 5B:
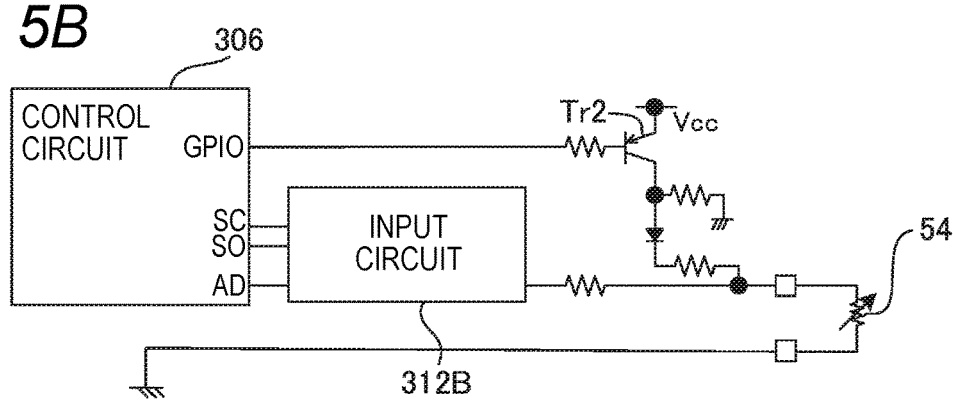

The transistor Tr2, which is a pnp transistor, is disposed between the voltage source Vcc and the input circuit 312B and its base is connected to a general-purpose input/output terminal GPIO of the control circuit 306. As shown in FIG. 5B, one end of the two-terminal variable resistor 54 is connected to the input circuit 312B and the other end is grounded. With these connections, an (analog) electrical signal that reflects a resistance value of the variable resistor 54 can be input to the input circuit 312B while the transistor Tr2 is on.

Figure 5C:
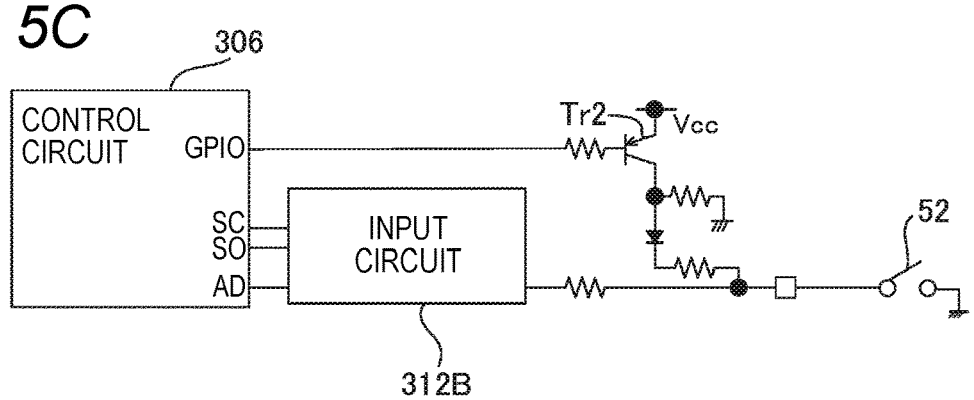

As shown in FIG. 5C, one end of an active-Lo-connected switch 52 is connected to the input circuit 312B and the other end is grounded. With these connections, an on/off state of the active-Lo-connected switch 52 can be input to the input circuit 312B while the transistor Tr2 is on.

Figure 5D:
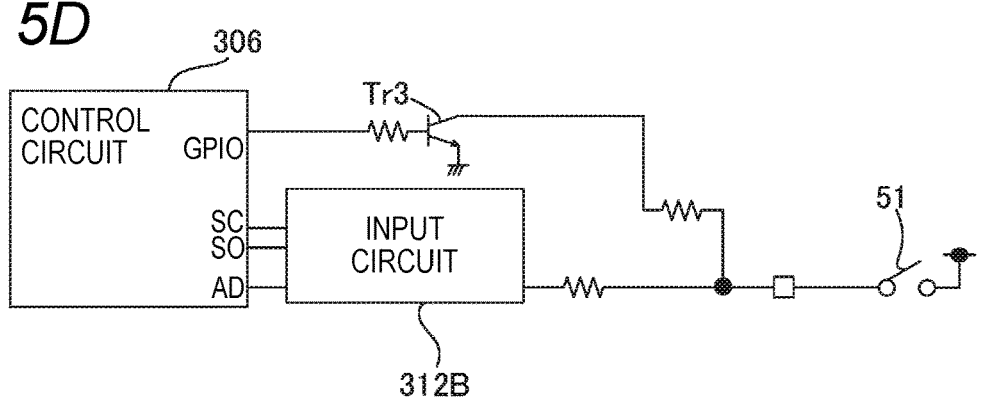

The transistor Tr3, which is an npn transistor, is disposed between an input circuit 312B and the ground and its base is connected to a general-purpose input/output terminal GPIO of the control circuit 306. As shown in FIG. 5D, one end of an active-Hi-connected switch 51 is connected to the input circuit 312B and the other end is connected to a voltage source. With these connections, an on/off state of the active-Hi-connected switch 51 can be input to the input circuit 312B while the transistor Tr3 is on.

Next, a description will be made of initial setting of the communication system 1A having the above-described configuration. The central ECU 2 sets a specification of the input circuit 312A and a specification of the switching circuit 315 in addition to the initial setting described above in the first embodiment.

First, a description will be made of the setting of a specification of the input circuit 312A. Where the extension board 302 is provided with the above-described input circuit 312A, the central ECU 2 instructs the control circuit 306 to set an input specification of the input circuit 312A. The control circuit 306 sets an input specification of the input circuit 312A to a specification specified by the central ECU 2.

Next, a description will be made of the setting of a specification of the switching circuit 315. Where the extension board 302 is provided with the above-described switching circuit 315, as in the case where the extension board 302 is provided with the above-described input circuit 312A, the central ECU 2 instructs the control circuit 306 to set an input specification of the switching circuit 315. The control circuit 306 sets a specification of on/off control of the transistors Tr1 to Tr3 to a specification specified by the central ECU 2.

More specifically, a corresponding relationship between input ports P1 of the input circuit 312B and kinds (switch 51, switch 52, variable resistor 53, or variable resistor 54) of extended electric devices 5 connected to the respective input ports P1 is set in the control circuit 306. When receiving a read instruction for a prescribed input port P1 from the central ECU 2, the control circuit 306 sets on/off of one of the transistors Tr1 to Tr3 corresponding to the kind of an extended electric device 5 corresponding to that input port P1.

Figure 6:
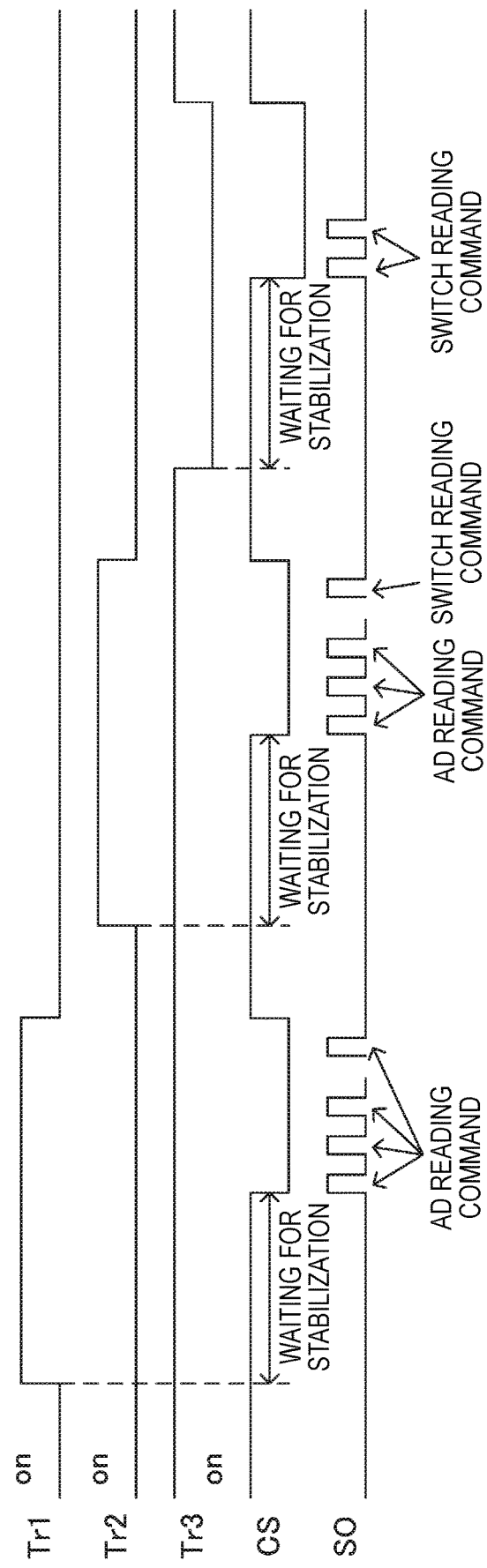
FIG. 6 is a time chart showing timing relationships between turning on/off of transistors Tr1 to Tr3 shown in FIG. 4, output from a chip selector terminal, and output from a serial output terminal.

If the extended electric device 5 corresponding to the read-instructed input port P1 is the variable resistor 53, as shown in FIG. 6 the control circuit 306 turns on the transistor Tr1 and then sets the chip selector terminal CS of the input circuit 312B at the Lo level and sends an input port AD reading command. If the extended electric device 5 corresponding to the read-instructed input port P1 is the variable resistor 54 or switch 52, the control circuit 306 turns on the transistor Tr2 and then sets the chip selector terminal CS of the input circuit 312B at the Lo level and sends an input port AD reading command or a switch reading command. If the extended electric device 5 corresponding to the read-instructed input port P1 is the switch 51, the control circuit 306 turns on the transistor Tr3 and then sets the chip selector terminal CS of the input circuit 312B at the Lo level and sends an input port switch reading command.

In the above-described embodiment, the control circuit 306 sets an input specification of the input circuit 312A by communicating with the central ECU 2. As a result, an input specification of the input circuit 312A can be set so as to be suitable for a specification of an extended electric device 5A. This means enhanced extendability.

In the above-described embodiment, the control circuit 306 sets a specification of the switching circuit 315 which is provided in the extension board 302 by communicating with the central ECU 2. As a result, a specification can be set by the switching circuit 315 even if the input circuit 312B does not have a specification setting function. This means enhanced extendability.

Although in the above-described embodiment the control circuit 306 sets an input specification of the input circuit 312A, the disclosure is not limited to this configuration. A configuration is possible in which the extension board 302 is provided with an output circuit 313 capable of output specification switching and the control circuit 306 sets an output specification of the output circuit 313 according to an instruction from the central ECU 2.

Furthermore, although in the above-described embodiment the extension board 302 is provided with the switching circuit 315 for switching the input specification of the input circuit 312B, the disclosure is not limited to this configuration. A configuration is possible in which the extension board 302 is provided with a switching circuit for switching the output specification of an output circuit 313 and the control circuit 306 sets a specification of that switching circuit according to an instruction from the central ECU 2.

Embodiment 3

Figure 7:
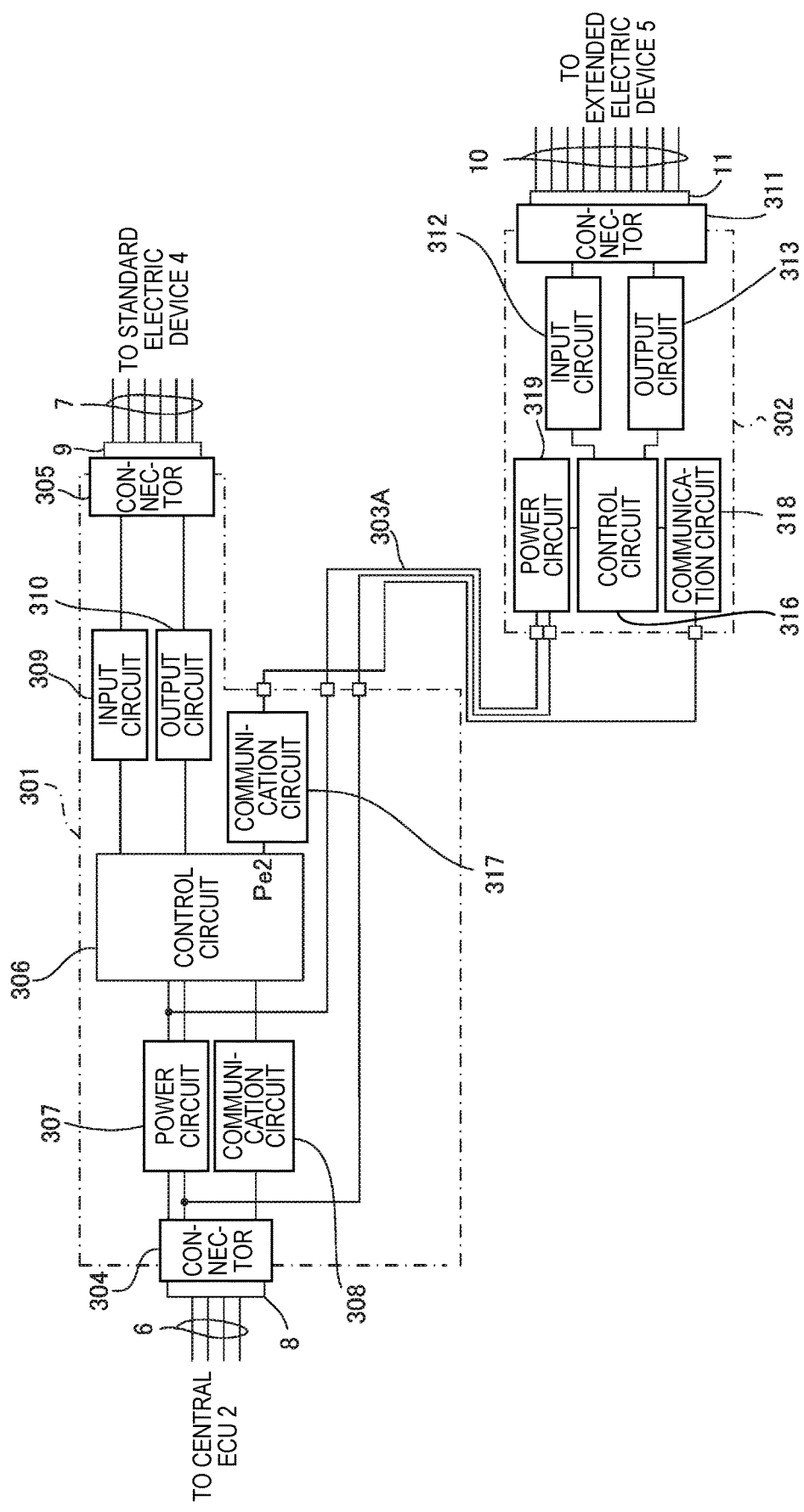
FIG. 7 is a detailed circuit diagram of each zone ECU employed in a third embodiment.

Next, a communication system 1B according to a third embodiment will be described with reference to FIG. 7. In FIG. 7, constituent elements having equivalent ones in the above-described communication system 1 according to the first embodiment shown in FIGS. 1 and 2 are given the same reference symbols as the latter and will not be described in detail. The second embodiment is much different from the first embodiment in that the connection portion 303 is formed by a wire harness 303A and the extension board 302 is likewise provided with a control circuit 316 (second control circuit) which is a microcomputer having a CPU.

The control circuit 306 provided in the standard board 301 functions as a gateway between the central ECU 2 and the control circuit 316 and conveys an instruction from the central ECU 2 also to the control circuit 316. Like the control circuit 306 employed in the first embodiment, the control circuit 316 controls the extended electric devices 5 according to instructions from the central ECU 2. The control circuit 306 is equipped with a communication terminal Pe2 for extension (extension terminal). When the extension board 302 is connected to the standard board 301, the control circuit 316 is connected to the communication terminal Pe2 via the communication circuits 317 and 318. The software of the control circuit 306 is designed so as to be able to make a selection between a specification that the control circuit 306 communicates with the control circuit 316 in the extension board 302 using the communication terminal Pe2 and a specification that the control circuit 306 does not communicate with the control circuit 316 in the extension board 302 using the communication terminal Pe2.

The extension board 302 is provided with a power circuit 319 in addition to the above-mentioned control circuit 316 and communication circuit 318. When the extension board 302 is connected to the standard board 301, power lines (positive and negative) on the standard board 301 are connected to the power circuit 319. The power circuit 319 converts a voltage supplied by the power lines into a voltage for the control circuit 316. Furthermore, the extension board 302 is provided with various circuits (in the example of FIG. 7, one input circuit 312 and one output circuit 313) suitable for kinds of extended electric devices 5.

In the above configuration, the extension board 302 is provided with the control circuit 316. With this measure, the wire harness 303A can be formed by three lines, that is, one communication line between the control circuits 306 and 316 and two power lines between the standard board 301 and the extension board 302; that is, the number of lines constituting the wire harness 303A can be made small. As such, the communication system 1B according to the third embodiment is suitable for a case that the standard board 301 and the extension board 302 are desired to be installed at distant places.

Next, a description will be made of initial setting of the communication system 1B having the above-described configuration. In the initial setting, the central ECU 2 communicates with the control circuit 306 and causes it to set a specification of the communication terminal Pe2 according to whether the extension board 302 is connected to the standard board 301. More specifically, if the extension board 302 is connected, the central ECU 2 instructs the control circuit 306 to set a specification that the control circuit 306 communicates with the control circuit 316 in the extension board 302 using the communication terminal Pe2. Once this specification is set, the control circuit 306 sends an instruction to the control circuit 316 when receiving it from the central ECU 2.

On the other hand, if the extension board 302 is not connected, the central ECU 2 instructs the control circuit 306 to set a specification that the control circuit 306 does not communicate with the control circuit 316 in the extension board 302 using the communication terminal Pe2. Once this specification is set, the control circuit 306 does not send an instruction to the control circuit 316 even when receiving it from the central ECU 2.

According to the third embodiment, as in the case of the first embodiment, it is not necessary to provide a standard board 301 for each specification, whereby cost reduction can be attained.

Features of the above-described communication systems and vicarious inputting and outputting units according the embodiments of the disclosure will be summarized concisely below in the form of items [1] to [7]:

[1] A communication system (1) including:
a host control device (2); and
a vicarious inputting and outputting unit (301) that controls an electric device (4, 5) by communicating with the host control device (2), wherein:
the vicarious inputting and outputting unit (301) comprises a standard board provided with a first control circuit (306) which controls the electric device (4, 5) and at least one of an input circuit (309) and an output circuit (310) for a standard electric device (4); and
the first control circuit (306) has an extension terminal (Pe, Pe2) for connection to an extension board (302) provided with at least one of an input circuit (312, 312A, 312B) and an output circuit (313) for an extended electric device (5) and is provided so as to be able to operate in response to respective specifications of plural kinds of extension terminals (Pe, Pe2), and a specification of the extension terminal (Pe, Pe2) is set through communication with the host control device (2).

[2] The communication system (1) according to item [1], further including:
  the extension board (302); and
  a connection unit (303, 303A) that connects the extension board (302) and the standard board (301).

[3] The communication system (1) according to item [1] or [2], wherein:
  the first control circuit (306) sets an input specification or an output specification of an extension terminal (Pe) connected directly to the input circuit (312, 312A, 312B) or the output circuit (313) provided on the extension board (302) through communication with the host control device (2).

[4] The communication system (1A) according to any one of items [1] to [3], wherein:
  an input specification of the input circuit (312A) provided on the extension board (302) or an output specification of the output circuit (313) provided on the extension board (302) is switchable; and
  the first control circuit (306) sets the input specification of the input circuit (312A) provided on the extension board (302) or the output specification of the output circuit (313) provided on the extension board (302) through communication with the host control device (2).

[5] The communication system (1A) according to any one of items [1] to [4], wherein:
  the extension board (302) is provided with a switching circuit (315) for switching of an input specification of the input circuit (312B) provided on the extension board (302) or an output specification or the output circuit (313) provided on the extension board (302); and
  the first control circuit (306) sets a specification of the switching circuit (315) provided in the extension board (302) through communication with the host control device (2).

[6] The communication system (1B) according to item [1] or [2], wherein:
  the extension board (302) is provided with a second control circuit (316) which communicates with the first control circuit (306) and controls the input circuit (312) provided on the extension board (302) or the output circuit (313) provided on the extension board (302); and
  the first control circuit (306) sets a specification that the second control circuit (316) is connected to an extension terminal or a specification that the extension board (302) is not connected, through communication with the host control device (2).

[7] A vicarious inputting and outputting unit (301) for controlling an electric device (4, 5) by communicating with a host control device (2), including:
  a standard board provided with a first control circuit (306) which controls the electric device (4, 5) and at least one of an input circuit (309) and an output circuit (310) for a standard electric device (4),
  wherein the first control circuit (306) has an extension terminal (Pe, Pe2) for connection to an extension board (302) provided with at least one of an input circuit (312, 312A, 312B) and an output circuit (313) for an extended electric device (5) and is provided so as to be able to operate in response to respective specifications of plural kinds of extension terminals (Pe, Pe2), and a specification of the extension terminal (Pe, Pe2) is set through communication with the host control device (2).

In the communication systems having the configurations of items [1] and [2] and the vicarious inputting and outputting unit having the configuration of item [7], the first control circuit is provided so as to be able to operate in such a manner as to be suitable for the specification of the plural kinds of extension terminals and the specification of the extension terminal is set through communication with the host device. As a result, it is not necessary to provide a vicarious inputting and outputting unit for each specification and cost reduction can be attained.

In the communication system having the configuration of item [3], the first control circuit sets an input specification or an output specification of an extension terminal connected directly to the input circuit or the output circuit provided in the extension board through communication with the host control device. As a result, the control circuit can set an input specification or an output specification of the extension terminal according to an input specification or an output specification of the input circuit or the output circuit provided in the extension board. This means enhanced extendability.

In the communication system having the configuration of item [4], the first control circuit sets an input specification or an output specification of the input circuit or the output circuit provided in the extension board by communicating with the host control device. As a result, an input specification or an output specification of the input circuit or the output circuit provided in the extension board can be set so as to be suitable for a specification of an extended electric device. This means enhanced extendability.

In the communication system having the configuration of item [5], the first control circuit sets a specification of the switching circuit that is provided in the extension board by communicating with the host control device. As a result, a specification can be set by the switching circuit even if the input circuit or the output circuit provided in the extension board does not have a specification setting function. This means enhanced extendability.

In the communication system having the configuration of item [6], the extension board is provided with the second control circuit which communicates with the first control circuit and controls the input circuit or the output circuit provided in the extension board. As a result, the number of lines connecting the standard board and the extension board can be made small. As such, this communication system is suitable for installation of the standard board and the extension board at different places.

What is claimed is:
1. A communication system comprising:
  a host control device; and
  a vicarious inputting and outputting unit that controls a standard electric device and an extended electric device by communicating with the host control device, wherein:
    the vicarious inputting and outputting unit comprises a standard board provided with a first control circuit which controls the standard electric device and the extended electric device and at least one of an input circuit and an output circuit for the standard electric device; and
    the first control circuit has an extension terminal connectable to an extension board provided with at least one of an input circuit and an output circuit for the extended electric device and is provided so as to be able to operate in response to respective specifications of plural kinds of extension terminals, and at least one specification of an input specification of an input terminal and an output specification of an output terminal of the extension terminal is set according to the at least one of an input specification of the input circuit and an output specification of the output circuit provided on the extension board through communication with the host control device.

2. The communication system according to claim 1, further comprising:
a connection unit that connects the extension board and the standard board.

3. The communication system according to claim 1, wherein:
the extension terminal is connected directly to the input circuit or the output circuit provided on the extension board, and
the first control circuit sets, through communication with the host control device, an input specification or an output specification of the extension terminal.

4. The communication system according to claim 1, wherein:
the input specification of the input circuit provided on the extension board or the output specification of the output circuit provided on the extension board is switchable; and
the first control circuit sets the input specification of the input circuit provided on the extension board or the output specification of the output circuit provided on the extension board through communication with the host control device.

5. The communication system according to claim 1, wherein:
the extension board is provided with a switching circuit for switching of the input specification of the input circuit provided on the extension board or the output specification of the output circuit provided on the extension board; and
the first control circuit sets a specification of the switching circuit provided on the extension board through communication with the host control device.

6. The communication system according to claim 1, wherein:
the extension board is provided with a second control circuit which communicates with the first control circuit of the standard board;
the second control circuit controls the input circuit provided on the extension board or the output circuit provided on the extension board; and
the first control circuit, of the standard board, is configured to set:
a specification that the second control circuit is connected to the extension terminal or
a specification that the extension board is not connected with the host control device.

7. A vicarious inputting and outputting unit for controlling a standard electric device and an extended electric device by communicating with a host control device, comprising:
a standard board provided with a first control circuit which controls the standard electric device and the extended electric device and at least one of an input circuit and an output circuit for the standard electric device,
wherein the first control circuit has an extension terminal for connection to an extension board provided with at least one of an input circuit and an output circuit for the extended electric device and is provided so as to be able to operate in response to respective specifications of plural kinds of extension terminals, and at least one specification of an input specification of an input terminal and an output specification of an output terminal of the extension terminal is set according to the at least one of an input specification of the input circuit and an output specification of the output circuit provided on the extension board through communication with the host control device.

* * * * *